United States Patent
Joy et al.

(10) Patent No.: US 7,657,009 B2
(45) Date of Patent: Feb. 2, 2010

(54) CALL BLOCK DISABLER

(75) Inventors: Jennifer Lynne Joy, Austin, TX (US);
Markus Weber, Pflugerville, TX (US);
Thomas Bradley Scholl, New Haven, CT (US)

(73) Assignee: AT&T Intellectual Property I, LP, Reno, NV (US)

( * ) Notice: Subject to any disclaimer, the term of this patent is extended or adjusted under 35 U.S.C. 154(b) by 703 days.

(21) Appl. No.: 11/434,673

(22) Filed: May 16, 2006

(65) Prior Publication Data
US 2007/0269035 A1 Nov. 22, 2007

(51) Int. Cl.
*H04M 11/00* (2006.01)

(52) U.S. Cl. .............. 379/91.02; 379/210.02

(58) Field of Classification Search .......... 379/93.02, 379/210.02
See application file for complete search history.

(56) References Cited

U.S. PATENT DOCUMENTS

| | | | |
|---|---|---|---|
| 5,467,388 A * | 11/1995 | Redd et al. | 379/210.02 |
| 5,495,521 A | 2/1996 | Rangachar | |
| 5,638,430 A | 6/1997 | Hogan et al. | |
| 5,696,817 A | 12/1997 | Yatsu | |
| 6,185,412 B1 | 2/2001 | Pentikainen et al. | |
| 6,259,779 B1 | 7/2001 | Council et al. | |
| 6,359,970 B1 * | 3/2002 | Burgess | 379/93.23 |
| 6,556,666 B1 | 4/2003 | Beyda et al. | |
| 6,788,775 B1 | 9/2004 | Simpson | |
| 6,990,187 B2 | 1/2006 | MacNamara et al. | |
| 7,162,022 B2 * | 1/2007 | Jupe et al. | 379/210.02 |
| 2003/0043983 A1 | 3/2003 | Pelletier et al. | |
| 2004/0029564 A1 | 2/2004 | Hodge | |
| 2004/0114747 A1 | 6/2004 | Trandal et al. | |
| 2004/0141598 A1 | 7/2004 | Moss et al. | |
| 2004/0213396 A1 | 10/2004 | MacNamara et al. | |
| 2004/0266405 A1 * | 12/2004 | Benco et al. | 455/414.1 |
| 2005/0013424 A1 | 1/2005 | Pelletier et al. | |
| 2005/0074109 A1 | 4/2005 | Hanson et al. | |
| 2005/0117714 A1 | 6/2005 | Chingon et al. | |
| 2005/0124316 A1 | 6/2005 | Islam et al. | |
| 2005/0207557 A1 | 9/2005 | Dolan et al. | |
| 2005/0238160 A1 | 10/2005 | Sunstrum | |
| 2005/0243974 A1 | 11/2005 | Pearson | |
| 2006/0036727 A1 | 2/2006 | Kurapati et al. | |
| 2006/0067501 A1 | 3/2006 | Piatt | |
| 2006/0072548 A1 * | 4/2006 | Mundra et al. | 370/352 |

\* cited by examiner

*Primary Examiner*—Stella L Woo
(74) *Attorney, Agent, or Firm*—Toler Law Group

(57) ABSTRACT

A dial tone generator outputs a particular dial tone to a party to indicate that a call block feature is enabled for the party. The call block feature is disabled for the party in response to a number of incoming calls for the party being greater than or equal to a threshold.

17 Claims, 2 Drawing Sheets

CALL BLOCK DISABLER

FIELD OF THE DISCLOSURE

The present disclosure is generally related to call blocking methods and systems.

BACKGROUND

Call blocking systems enable users to block incoming telephone calls. An example of a call blocking system is disclosed in U.S. Patent Application Publication No. 2004/0076285. A user can enter a list of phone numbers of potential calling parties whose incoming telephone calls are to bypass the call blocking feature.

DETAILED DESCRIPTION OF THE DRAWINGS

Disclosed herein are embodiments of methods and systems that enhance features provided by a call blocking system. A call block feature can be disabled or bypassed, under particular conditions, to provide a way for trusted people to remain in communication in case of an emergency.

Figure 1:
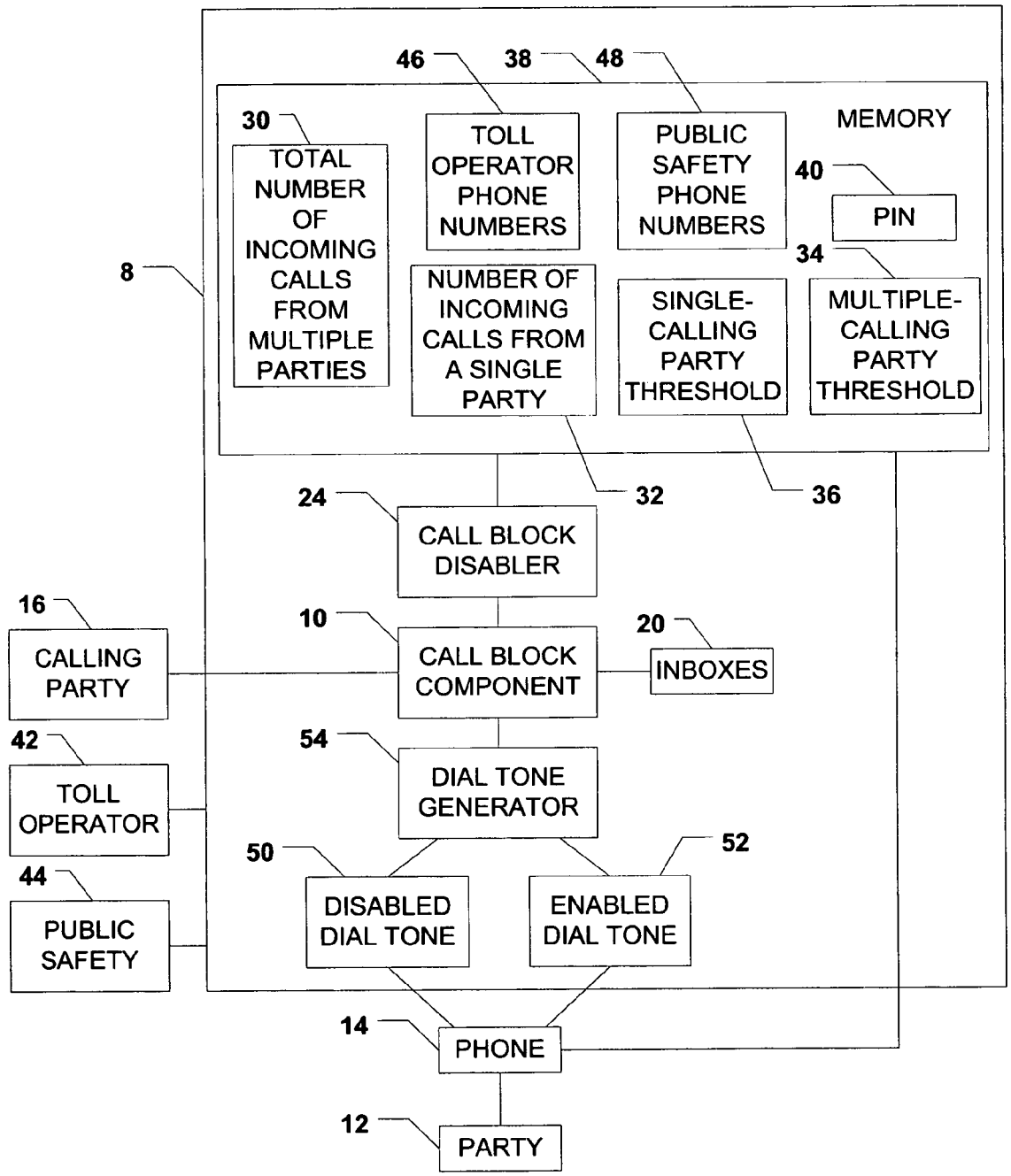
FIG. 1 is a block diagram of an embodiment of a call block system.

FIG. 1 is a block diagram of an embodiment of a call block system 8. The system 8 comprises a call block component 10 that provides a call block feature for any of a plurality of parties of a telephone system. The call block component 10 may provide a do-not-disturb feature, a snooze feature, or another call block feature that enables each party to control whether or not incoming calls to its phone are to be blocked. The call block feature may be a timed call block feature that blocks incoming calls for a particular time period and/or until a particular end time, and thereafter does not block incoming calls. Each party may configure its own particular time period and/or end time. The timed call block feature may be enabled, for example, for a mobile telephone of a person who is to attend a meeting, for a telephone of a person who is to take a nap, or for a telephone of a family who wishes not to be disturbed during a meal. Optionally, user interaction with the call block feature is enabled through a privacy manager feature of the telephone system.

Each party may configure an amount of time that the call block feature is enabled for its phone. When the call block feature is enabled for a party 12, an incoming phone call for the party 12 does not cause the party's phone 14 to ring. Although the party's phone 14 is not ringing, the call block component 10 may provide a ringing signal to a calling party 16 and/or may play a message to inform the calling party 16 that the party 12 does not want to be disturbed. Optionally, the call block component 10 may provide, for each party, an associated inbox 20 to receive messages for the party when the call block feature is enabled for the party. The messages can be left by calling parties whose calls are blocked. Each party can play back recorded messages in its associated inbox 20.

The call block component 10 is responsive to a call block disabler 24. The call block disabler 24 acts to disable the call block feature for a party based on one or more conditions. By disabling an otherwise enabled call block feature for the party 12, one or more subsequent incoming phone calls for the party 12 are not blocked, and thus can cause the party's phone 14 to ring. Examples of the one or more conditions for disabling the call block feature are as follows.

The call block disabler 24 can count one or more respective numbers of incoming calls for each party whose call block feature is enabled. The call block disabler 24 can disable the call block feature for a party in response to a number of incoming calls for the party being greater than or equal to a threshold. This feature allows the call block feature to be automatically disabled for a party if an unusually large number of calls intended for the party have been blocked. This feature addresses situations where repeated attempts are made to contact the party within a short period of time, for example. The threshold(s) for a party can be configured by the party using his/her phone.

The number of incoming calls may be a total number of incoming calls 30 for the party from a plurality of calling parties while the call block feature is enabled for the party. Alternatively, the number of incoming calls may be a number of incoming calls 32 from one calling party while the call block feature is enabled for the party.

Running counts of the total number of incoming calls 30 and the number of incoming calls 32 are stored in a memory 38. The counts are initialized (e.g. to zero) for a party when the party enables the call block feature.

The system 8 may store a multiple-calling-party threshold 34 and/or a single-calling-party threshold 36 in the memory 38. The call block disabler 24 can use the multiple-calling-party threshold 34 for disabling the call block feature based on the total number of incoming calls 30 from a plurality of calling parties. The call block disabler 24 can use the single-calling-party threshold 36 for disabling the call block feature based on the number of incoming calls 32 from one calling party. The multiple-calling-party threshold 34 may differ from (e.g. be greater than) the single-calling-party threshold 36. Each party may configure its own multiple-calling-party threshold and its own single-calling-party threshold.

The call block disabler 24 can cause an incoming call to bypass the call block feature if a calling party enters a particular personal identification number (PIN) 40 or an alternative pass code associated with the called party. Each party can configure its own PIN or alternative pass code with the call block disabler 24 for storage in the memory 38. Each party can share its PIN or alternative pass codes with a limited number of trusted parties. The PIN 40 or alternative pass code may cause only the incoming call to bypass the call block feature, or may cause the call block feature to be disabled for subsequent incoming calls to the party. Use of the PIN 40 or alternative pass code enables the call block feature to be remotely disabled.

The call block disabler 24 can cause any incoming call from a toll operator 42 or a public safety party 44 (e.g. police, fire, E911) to bypass the call block feature. One or more toll operator phone numbers 46 and/or one or more public safety phone numbers 48 can be stored in the memory 38 for access by the call block disabler 24.

The call block component 10 may output different dial tones to a party dependent on whether its call block feature is enabled or disabled. For example, the call block component 10 can output a first particular dial tone 50 to a party whose call block feature is disabled, and a second particular dial tone 52 to a party whose call block feature is enabled. The first particular dial tone 50 may comprise a standard dial tone presented to parties of the telephone system. The second particular dial tone 52 differs from and is audibly distinguishable from the first particular dial tone 50. The second particular dial tone 52 is dedicated to indicate that the call block feature is enabled for the party. When the party 12 puts its phone 14 in an off-hook state while its call block feature is enabled, the phone 14 presents the second particular dial tone 52 to the party 12. The second particular dial tone 52 serves to remind the party 12 that the call block feature is enabled for the phone. The second particular dial tone 52 may be outputted regardless of whether the associated inbox 20 for the party 12 is empty or otherwise not full, or is full. The second particular dial tone 52 (and optionally the first particular dial tone 50) is outputted by a dial tone generator 54.

Figure 2:
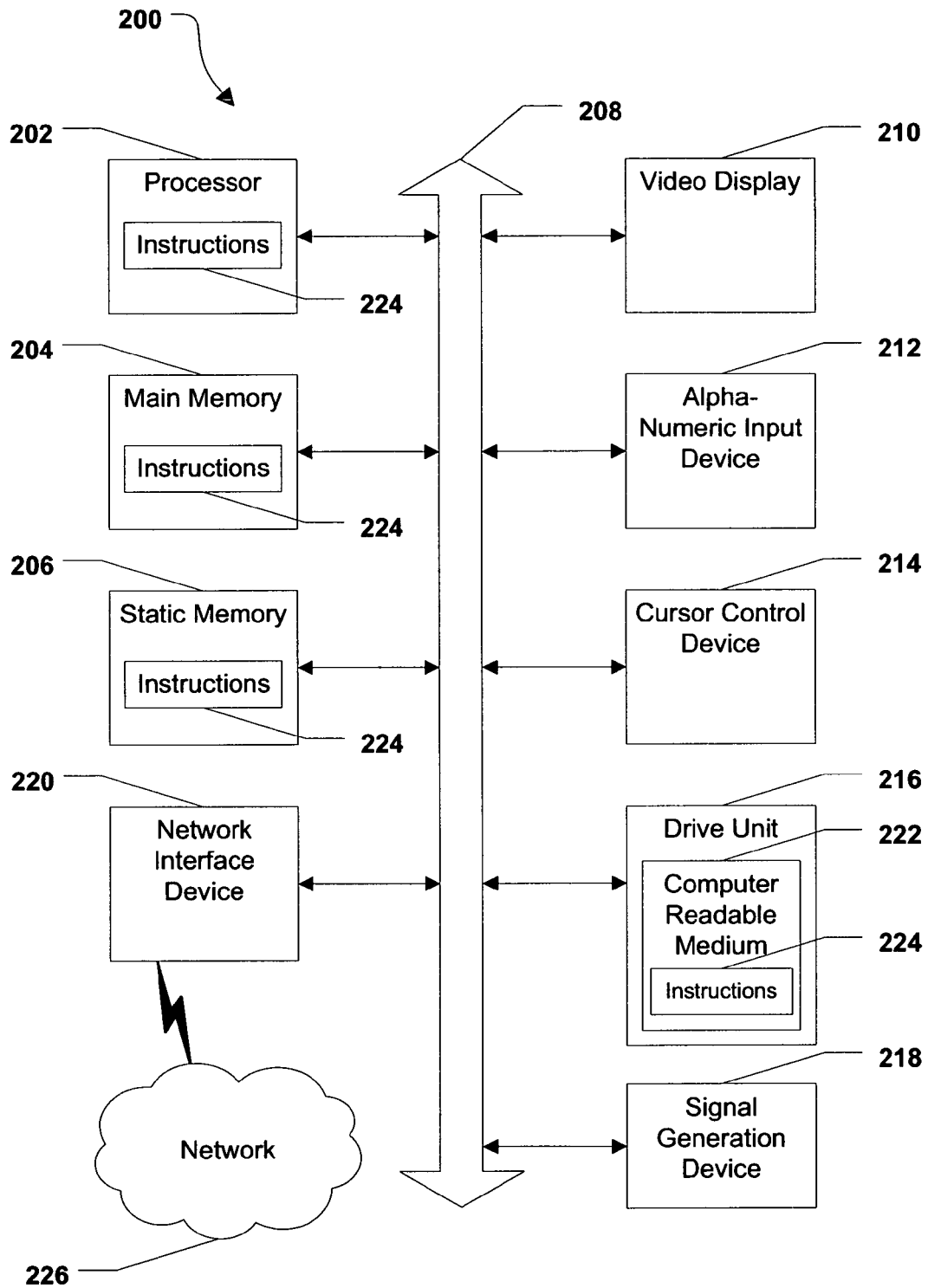
FIG. 2 is a block diagram of an illustrative embodiment of a general computer system.

Referring to FIG. 2, an illustrative embodiment of a general computer system is shown and is designated 200. The computer system 200 can include a set of instructions that can be executed to cause the computer system 200 to perform any one or more of the methods or computer based functions disclosed herein. The computer system 200 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 200 can be implemented using electronic devices that provide voice, video or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 2, the computer system 200 may include a processor 202, e.g., a central processing unit (CPU), a graphics processing unit (GPU), or both. Moreover, the computer system 200 can include a main memory 204 and a static memory 206, that can communicate with each other via a bus 208. As shown, the computer system 200 may further include a video display unit 210, such as a liquid crystal display (LCD), an organic light emitting diode (OLED), a flat panel display, a solid state display, or a cathode ray tube (CRT). Additionally, the computer system 200 may include an input device 212, such as a keyboard, and a cursor control device 214, such as a mouse. The computer system 200 can also include a disk drive unit 216, a signal generation device 218, such as a speaker or remote control, and a network interface device 220.

In a particular embodiment, as depicted in FIG. 2, the disk drive unit 216 may include a computer-readable medium 222 in which one or more sets of instructions 224, e.g. software, can be embedded. Further, the instructions 224 may embody one or more of the methods or logic as described herein. In a particular embodiment, the instructions 224 may reside completely, or at least partially, within the main memory 204, the static memory 206, and/or within the processor 202 during execution by the computer system 200. The main memory 204 and the processor 202 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 224 or receives and executes instructions 224 responsive to a propagated signal, so that a device connected to a network 226 can communicate voice, video or data over the network 226. Further, the instructions 224 may be transmitted or received over the network 226 via the network interface device 220.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method, comprising:
   storing a multiple-calling-party threshold for disabling a call block feature for a called party;
   storing a single-calling-party threshold for disabling the call block feature; and
   disabling the call block feature, said disabling being in response to a number of incoming calls for the called party being greater than or equal to a threshold,
   wherein the threshold used in said disabling is the multiple-calling-party threshold, and
   wherein the number of incoming calls is a total number of incoming calls for the called party from a plurality of calling parties while the call block feature is enabled for the called party.

2. The method of claim 1, wherein the multiple-calling-party threshold differs from the single-calling-party threshold.

3. The method of claim 1, further comprising receiving the threshold from the called party.

4. A method, comprising:
   outputting a dial tone to a party, the dial tone to indicate that a call block feature is enabled for the party;
   wherein the call block feature has an associated inbox to receive messages for the party when the call block feature is enabled for the party, and wherein the dial tone is outputted when the associated inbox is not full.

5. The method of claim 4, wherein the dial tone is output when the associated inbox is empty.

6. A system comprising:
   a call block disabler to disable a call block feature for a called party, the call block disabler to disable the call block feature in response to a number of incoming calls for the called party being greater than or equal to a threshold;
   a memory to store a multiple-calling party threshold for disabling the call block feature and to store a single-calling-party threshold for disabling the call block feature;
   wherein the number of incoming calls is a total number of incoming calls for the called party from a plurality of calling parties while the call block feature is enabled for the called party, and
   wherein the threshold used by the call block disabler is the multiple-calling-party threshold.

7. The system of claim 6, wherein the multiple-calling-party threshold differs from the single-calling-party threshold.

8. The system of claim 6, wherein the threshold is received from the called party.

9. A system, comprising:
   a dial tone generator to output a dial tone to a party, the dial tone to indicate that a call block feature is enabled for the party;
   wherein the call block feature has an associated inbox to receive messages for the party when the call block feature is enabled for the party, and wherein the dial tone is outputted when the associated inbox is not full.

10. The system of claim 9, wherein the dial tone is output when the associated inbox is empty.

11. A computer-readable storage medium comprising computer program code to cause a computer to:
    store a multiple-calling-party threshold for disabling a call block feature for a called party;
    store a single-calling-party threshold for disabling the call block feature; and
    disable the call block feature, said disabling being in response to a number of incoming calls for the called party being greater than or equal to a threshold,
    wherein the threshold is the multiple-calling-party threshold, and
    wherein the number of incoming calls is a total number of incoming calls for the called party received from a plurality of calling parties while the call block feature is enabled for the called party.

12. A computer-readable storage medium comprising computer program code to cause a computer to:

output a dial tone to a party, the dial tone to indicate that a call block feature is enabled for the party;

wherein the call block feature has an associated inbox to receive messages for the party when the call block feature is enabled for the party, and wherein the dial tone is outputted when the associated inbox is not full.

13. A method, comprising:

storing a multiple-calling-party threshold for disabling a call block feature for a called party;

storing a single-calling-party threshold for disabling the call block feature;

disabling the call block feature, said disabling in response to a number of incoming calls for the called party satisfying a threshold, wherein the number of incoming calls is a number of incoming calls for the called party received from one calling party while the call block feature is enabled for the called party, and wherein the threshold used in said disabling is the single-calling-party threshold.

14. The method of claim 13, wherein the multiple-calling-party-threshold differs from the single-calling-party threshold.

15. A system, comprising:

a call block disabler to disable a call block feature for a called party, the call block disabler to disable the call block feature in response to a number of incoming calls for the called party satisfying a threshold;

a memory to store a multiple-calling party threshold for disabling the call block feature and to store a single-calling-party threshold for disabling the call block feature;

wherein the number of incoming calls is a number of incoming calls for the called party received from one calling party while the call block feature is enabled for the called party, and wherein the threshold used by the call block disabler is the single-calling-party threshold.

16. The system of claim 15, wherein the multiple-calling-party threshold differs from the single-calling-party threshold.

17. The system of claim 15, wherein the number of incoming calls for the called party is greater than or equal to the threshold.

* * * * *